US009087441B2

(12) United States Patent
Gadonniex et al.

(10) Patent No.: US 9,087,441 B2
(45) Date of Patent: Jul. 21, 2015

(54) NOTIFICATION APPLIANCE CIRCUIT WITH ENERGY STORING NOTIFICATION DEVICES

(75) Inventors: Dennis Michael Gadonniex, Bradenton, FL (US); Donald Becker, Bradenton, FL (US)

(73) Assignee: UTC FIRE & SECURITY CORPORATION, Farmington, CT (US)

( * ) Notice: Subject to any disclaimer, the term of this patent is extended or adjusted under 35 U.S.C. 154(b) by 456 days.

(21) Appl. No.: 13/309,638

(22) Filed: Dec. 2, 2011

(65) Prior Publication Data

US 2013/0141245 A1 Jun. 6, 2013

(51) Int. Cl.

*G08B 21/00* (2006.01)
*G08B 23/00* (2006.01)
*G08B 5/00* (2006.01)
*H02J 7/00* (2006.01)
*G08B 5/38* (2006.01)
*G08B 29/18* (2006.01)

(52) U.S. Cl.

CPC ................ *G08B 5/38* (2013.01); *G08B 29/181* (2013.01)

(58) Field of Classification Search

None
See application file for complete search history.

(56) References Cited

U.S. PATENT DOCUMENTS 4,754,375 A * 6/1988 Ferenc .......................... 362/517
5,047,695 A 9/1991 Allen et al.
5,105,126 A 4/1992 Girard, Jr.
5,121,034 A 6/1992 Allen et al.
5,198,727 A 3/1993 Allen et al.
5,673,999 A 10/1997 Koenck
6,316,867 B1 11/2001 Roberts et al.
6,376,993 B1 4/2002 Romanczuk et al.
6,686,702 B1 2/2004 Holmes
7,003,620 B2 2/2006 Avraham et al.
7,043,156 B2 5/2006 Tsuchida et al.
7,242,314 B2 7/2007 Fisler
7,333,004 B2 2/2008 Ha et al.
7,400,227 B2 * 7/2008 Becker et al. ............ 340/286.05
7,471,049 B2 12/2008 Savage, Jr. et al.
7,545,104 B2 6/2009 Maishima
7,580,234 B2 8/2009 Tamosaitis
7,633,284 B2 * 12/2009 Ingram et al. .............. 324/76.11
8,421,646 B2 * 4/2013 Curran et al. ............ 340/815.45
8,482,427 B2 * 7/2013 Curran et al. ............ 340/815.45
2005/0219060 A1 * 10/2005 Curran et al. ............ 340/815.45
2006/0241876 A1 * 10/2006 Ingram et al. ................... 702/57
2007/0242472 A1 * 10/2007 Gergets et al. ................ 362/493
2008/0001726 A1 * 1/2008 Stewart et al. ................ 340/331
2008/0094042 A1 4/2008 Ferrario (Continued)

FOREIGN PATENT DOCUMENTS

DE 102006015175 A1 10/2007

OTHER PUBLICATIONS

International Report on Patentability for application PCT/US2012063449, mailed Jun. 12, 2014, 9 pages.

*Primary Examiner* — Julie Lieu
(74) *Attorney, Agent, or Firm* — Cantor Colburn LLP

(57) ABSTRACT

A notification appliance circuit (NAC) includes notification devices having a high capacity rechargeable energy storage device such as a supercapacitor and a strobe circuit. The supercapacitor can provide energy to produce flashes over an extended time period without fully discharging. The notification devices can also make use of the fallback power strategy in which the strobe circuit operates with reduced intensity while the supercapacitor is being recharged.

14 Claims, 1 Drawing Sheet

(56) References Cited

U.S. PATENT DOCUMENTS

| | | | | |
|---|---|---|---|---|
| 2008/0129219 | A1 | 6/2008 | Smith et al. | |
| 2008/0272654 | A1* | 11/2008 | Lontka | 307/65 |
| 2009/0009352 | A1* | 1/2009 | Savage et al. | 340/663 |
| 2009/0167544 | A1* | 7/2009 | Becker et al. | 340/636.12 |
| 2009/0174345 | A1 | 7/2009 | Vaucourt et al. | |
| 2010/0066557 | A1 | 3/2010 | Henson et al. | |
| 2010/0265080 | A1 | 10/2010 | Henson | |
| 2011/0043367 | A1* | 2/2011 | Becker et al. | 340/577 |
| 2012/0068853 | A1* | 3/2012 | Curran et al. | 340/815.45 |
| 2013/0106605 | A1* | 5/2013 | Mullins et al. | 340/541 |

* cited by examiner

NOTIFICATION APPLIANCE CIRCUIT WITH ENERGY STORING NOTIFICATION DEVICES

BACKGROUND

Fire alarm systems and mass notification systems typically use distributed notification devices to notify the public of the presence of fire, smoke, and other conditions. In these systems, a notification appliance circuit (NAC) is often used to connect the notification devices to a control panel.

Power for the notification device is provided over the NAC from the control panel. Primary power to control panel may be, for example, AC power derived from a utility grid. Many systems also include a battery backup power supply at the control panel in order to maintain operations when the main power supply is faulty or interrupted.

Power supplied through the NAC to notification devices may be limited by the worst case voltage to the NAC and by the voltage drop across the NAC wiring. This may result in less than optimal coverage for NAC circuits.

For example, an NAC may be designed to have 30 notification devices, each drawing 100 milliamps and having a rated spacing of 10 feet at a working voltage and current. Thus, the NAC would provide notification coverage of 300 feet. Under real world conditions, because the voltage drops from the supply through various system components, for example, a panel, circuit wiring, and the wiring of the NAC itself, the NAC may be limited to fewer devices and less coverage length because the working voltage and current for all the devices may not be provided over the entire NAC as originally designed.

One commonly used type of NAC system makes use of reverse polarity circuits that are supervised by an end of the line resistor. The notification devices themselves may be simple on/off devices with a diode that maintains the notification devices in an off state when the power on the NAC has a first polarity. The diode completes the power circuit for the notification device when the circuit polarity is reversed from the first polarity to a second polarity. Each of the notification devices has the same or similar operating characteristics in this type of system.

The NAC circuit has a supervisory state, in which the polarity of the voltage on the NAC circuit wires is such that the diodes within the notification devices are reversed biased. In the supervisory state, the NAC circuit is supervised, but the notification devices are not active.

When the polarity of the voltage on the NAC circuit wires is reversed, the NAC circuit is in an active state. The diodes within the notification devices are forward biased, allowing current to flow through the notification devices to activate the notification devices.

A notification device may provide both visual as well as audible signaling. The visual signaling can be produced by a strobe circuit that includes a light source, such as a gas filled flash tube or light emitting diodes (LEDs), as well as a driver or trigger circuit that provides the necessary voltage and current to either the light source. The strobe circuit is typically powered by a storage capacitor, which must be recharged with current from the NAC circuit after each flash produced by the strobe circuit. The current required to recharge the capacitor after every flash represents a significant portion of the total current requirement of each notification device.

SUMMARY

A notification appliance circuit with a plurality of notification devices connected by NAC wiring. Each of the notification devices includes a strobe circuit and a high capacity rechargeable energy storage device that has the capacity to store enough energy to repeatedly flash the strobe over an extended period without fully discharging.

In one embodiment of the invention, the notification devices can also make use of a fallback power strategy during a portion of the time when the notification devices are active. During a fallback power period, the strobe circuit of the notification device operates at a reduced power level. During the fallback power period, some of the current flowing through the NAC wiring is used to recharge the rechargeable energy storage device. The fallback period begins after the notification device has been active for a time period and the stored charge in the energy storage device has become partially depleted by the strobe circuit operating at a full power level.

DETAILED DESCRIPTION

Figure 1:
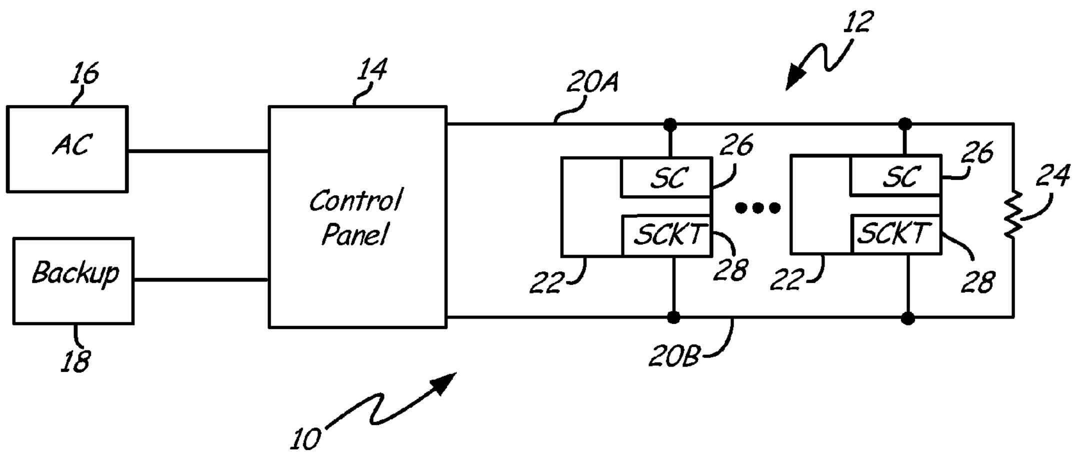
FIG. 1 is a block diagram illustrating an NAC system.

FIG. 1 shows notification appliance circuit (NAC) system 10, which includes notification appliance circuit (NAC) 12, control panel 14, AC power supply 16, and backup power supply 18. In the embodiment shown in FIG. 1, NAC 12 is a two wire circuit including wires 20A and 20B, notification devices 22, and termination resistor 24. Each of the notification devices 22 includes high capacity energy storage device 26 such as a supercapacitor (SC) and strobe circuit (SCKT) 28.

Control panel 14 is connected to one end of wires 20A and 20B. When a notification or alarm condition exists, control panel 14 activates NAC 12 by applying voltage of the proper polarity to wires 20A and 20B. The electrical power supplied over wires 20A and 20B activates each of notification devices 22 to produce an alarm or notification output, such as strobe flashes, an audible alarm, or both. Power to control panel 14 is normally supplied by AC power supply 16. When AC power is not available, power is supplied to control panel 14 by backup power supply 18.

When an alarm condition is not present, control panel 16 maintains the voltage on wires 20A and 20B in a reversed polarity to the polarity used during the active mode. When the reversed polarity is applied, NAC 12 is in the supervisory mode. Current can continue to flow through wires 20A and 20B and termination resistor 24. This allows control panel 14 to monitor or supervise NAC 12 when the notification devices are not active. In the supervisory state, control panel 14 can monitor NAC 12 to detect open or shorted wiring strings by sensing current through termination resistor 24.

During the supervisory mode, high capacity energy storage device 26 is charged to a fully charged state by current from NAC wires 20A and 20B, and then is maintained in that fully charged state until the next time NAC 12 is in the active state. Energy storage device 26 preferably is a supercapacitor (or supercapacitors) with the ability to store enough charge to operate strobe circuit 28 to produce flashes at a rate of, for example, 1 Hz for a period of 5 minutes or more without being recharged. Supercapacitors exhibit low leakage, so that the current required to maintain energy storage device 26 in a fully charged state is relatively low.

When control panel 14 switches NAC 12 to an active state, each of the notification devices 22 must be powered so that it can provide a visual or audible notification, or both. In some jurisdictions, it is required that an nominal 24 volt NAC excitation voltage with a steady current limit appropriate for powering a specified number of notification devices that are wired in parallel. The number of notification devices 22 that can be connected in NAC 12, and therefore how far wires 20A and 20B can run, is dependent upon the maximum current draw of each notification device 22. NAC system 10 reduces the maximum current supplied by control panel 14 when notification devices 22 are active by the use of high capacity energy storage devices 26. Because energy storage device 26 can operate strobe circuit 28 over an extended time period without the need to be recharged after each flash, the current draw of notification devices 22 in the active state can be the current required to operate all of the circuitry other than the strobe circuit plus some charging current for partially recharging energy storage device 26. As a result, a reduction in the overall current draw of NAC 12 during the active state can be achieved. Lower current draw offers the opportunity to increase the number of notification devices 22 and extend the coverage of NAC 12.

Figure 2:
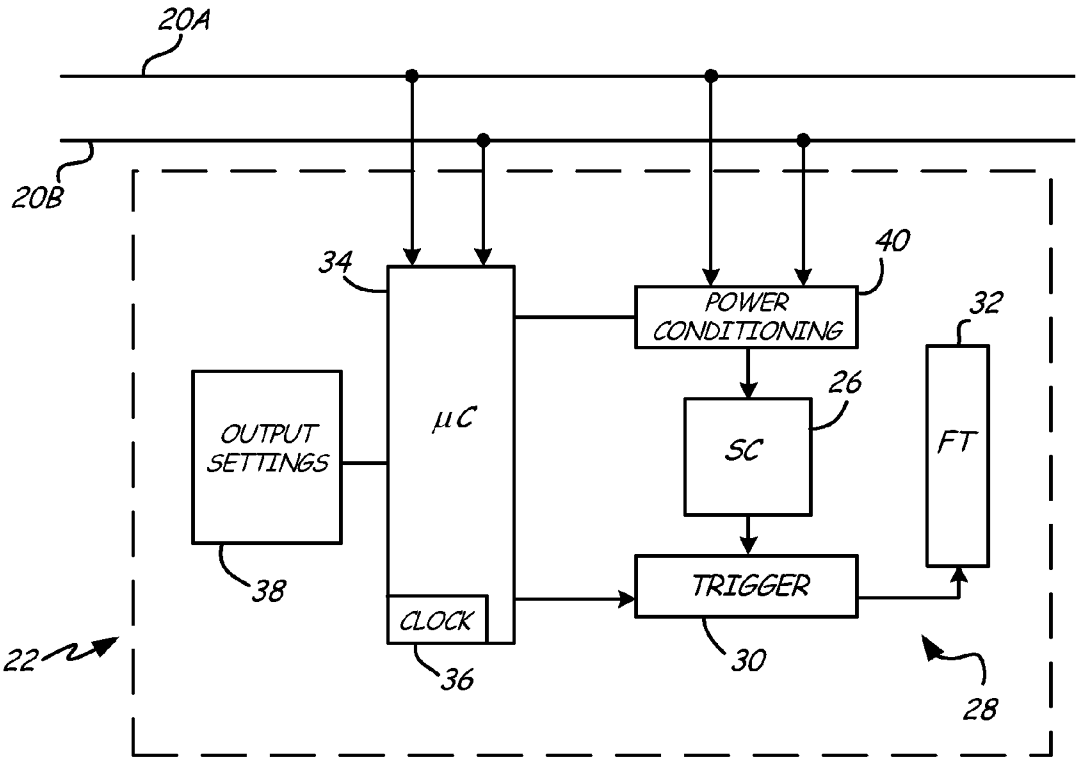
FIG. 2 is a block diagram of one of the notification devices of the NAC system FIG. 1.

FIG. 2 is a block diagram of notification device 22. In this embodiment, notification device 22 includes high capacity energy storage device 26, strobe circuit 28 (which includes trigger circuit 30 and flashtube (FT) 32), microcontroller (μC) 34, clock 36, output setting storage 38, and power conditioning circuitry 40.

Microcontroller 34 monitors the status of voltage on NAC lines 20A and 20B to determine when NAC 12 is in a supervisory state, and when it is in an active state. Microcontroller 34 provides control signals to power conditioning circuit 40 to control changing of energy storage device 26 and control signals to trigger circuit 30 to control the timing and intensity of flashes produced by flashtube 32. Microcontroller 34 receives clock signals from clock 36 and instructions for output settings from output settings storage 38.

Power conditioning circuitry 40 controls the charging of energy storage device 26. In one embodiment, energy storage device 26 is a single supercapacitor which, when fully charged, has a voltage of between 300 to 400 volts. Power conditioning circuitry 40 charges energy storage device 26 during the supervisory mode until energy storage device 26 is fully charged. Once a full charge has been achieved, power conditioning circuitry 40 monitors the state-of-charge, and supplies additional charging current as needed to keep energy storage device 26 in a fully charged state. Once energy storage device 26 is fully charged, the amount of current draw required to maintain a full charge is very low.

When microcontroller 34 senses a change in polarity on wires 20A and 20B indicating an active mode, microcontroller 34 begins providing trigger pulses to trigger circuit 30. The trigger pulses cause trigger circuit 30 to supply current from energy storage device 26 to flashtube 32, which is a gas-filled flash tube, such as a xenon flash tube. The flashes produced by trigger circuit 30 and flashtube 32 will continue as long as notification device 22 and NAC 12 are in an active state. For an initial period of 5 minutes or more, the flashes produced by flashtube 32 have a duration of about 300 microseconds to 500 microseconds at a rate of 1 Hz. This results in a duty cycle of about 0.005 percent. With an average current of 100 milliamperes, the instantaneous current drawn from energy storage device 26 during one of the pulses may be on the order of 2000 amperes.

Energy storage device 26 has a storage capacity large enough to operate flashtube 32 for an extended period of time, such as 5 minutes or more, at a 1 Hz strobe rate without requiring a full recharge while in the active state. As a result, it is not necessary to deliver charging current sufficient to fully recharge energy storage device 26 after each flash, as has been the case with prior art notification devices that use an ordinary capacitor to store charge that is delivered to a flashtube. Power conditioning circuitry 40 may provide some recharging of energy storage device 26 throughout the period in which notification device 22 is in the active mode and strobe flashes are being generated. This charging current, however, does not need to be enough to replace the current drawn in generating a flash, because the storage capacity of energy storage device 26 is large enough to produce current to operate the flashtube for an extended period of time without fully recharging. For example, the charging current provided to energy storage device 26 while notification device 22 is active may be in the order of 2 milliamps.

If notification device 22 remains active for a long period of time, the net charge stored by energy storage device 26 will decrease. Based on the amount of time elapsed during the active mode, or based upon a sensed level of charge (or voltage) on energy storage device 26, microcontroller 34 may initiate a fallback power operation in which intensity of the strobe flash is reduced so that less power is consumed, and the charging of energy storage device 26 between flashes is increased to build up the net charge stored in energy storage device 26. Microcontroller 34 can control the intensity of the flashes by changing the voltage of the pulses supplied by trigger circuit 30 to flashtube 32. Changing the voltage to flashtube 32 changes the brightness or intensity of the strobe flashes.

Restricting the full intensity to about 5 minutes has an additional benefit: it will greatly reduce the wear and tear on the notification devices over their operational life. The vast majority of the activations are for the non-emergency purposes of system maintenance testing and occupant training drills, rather than for actual emergency events. Thus, the reduced intensity is particularly appropriate in view of the non-emergency usage.

When the active state ends, flashtube 32 is no longer being flashed and no longer consuming power from energy storage device 26. During the supervisory state, power conditioning circuitry 40 provides charging current to energy storage device 26 to recharge device 26 to its fully charged state, so that it is ready for the next time an active state occurs. Once a full charge is achieved, power conditioning circuitry 40 reduces the amount of charging current to only that which is needed to offset the loss of charge caused by leakage.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. For example, although the invention has been described in the context of a NAC system in which switching between supervisory and active states is achieved by reversing polarity of the NAC wires, the invention is applicable to other NAC configurations that do not rely upon polarity reversal to initiate an active or alarm state. Therefore, it is intended that the invention not be limited to the particular embodiment(s) disclosed, but that the invention will include all embodiments falling within the scope of the appended claims.

The invention claimed is:

1. A notification appliance circuit (NAC) comprising:

a plurality of notification devices, each device including a strobe circuit and an energy storage device for supplying electrical energy to the strobe circuit to generate light flashes, the electrical storage device having a capacity to store enough electrical energy for repeated generation of light flashes over a time period without fully discharging;

circuit wiring connected to the notification devices to provide electrical power to the notification devices;

a power conditioning circuit connected to the circuit wiring for providing charging current to the energy storage device; and a controller for providing control signals to the power conditioning circuit to control the charging current provided to the energy storage device;

wherein the controller provides control signals to cause the power conditioning circuit to fully charge the energy storage device when the NAC is in a supervisory state;

wherein the controller provides control signals to cause the power conditioning circuit to recharge the energy storage device when the NAC is in an active state and the energy storage device has been partially discharged;

wherein the controller provides control signals to the strobe circuit to reduce intensity of the light flashes during a period when the energy storage device is being recharged when the NAC is in the active state.

2. The NAC of claim 1, wherein the energy storage device comprises a supercapacitor.

3. The NAC of claim 2, wherein the supercapacitor has a voltage of about 300 volts to 400 volts when fully charged.

4. The NAC of claim 1, wherein the energy storage device has a capacity to store enough electrical energy for repeated generation of flashes at a rate of 1 Hz for at least 5 minutes without requiring full recharge.

5. The NAC of claim 1, wherein in the supervisory state, voltage on the circuit wiring has a first polarity and in an active state, voltage on the circuit wiring has a second polarity opposite the first polarity, wherein the energy storage device is charged during the supervisory mode.

6. The NAC of claim 1, wherein the strobe circuit comprises a light source and a trigger circuit, and wherein the trigger circuit delivers electrical energy from the energy storage device to the light source to produce a light flash.

7. The NAC of claim 6, wherein the light source comprise a gas-filled flashtube.

8. A notification device for use in a notification appliance circuit (NAC), the notification device comprising:

a strobe circuit for generating light flashes;

an energy storage device for supplying electrical energy to the strobe circuit to generate light flashes, the electrical storage device having a capacity to store enough electrical energy for repeated generation of light flashes over a time period without fully discharging;

a power conditioning circuit connected to the circuit wiring for providing charging current to the energy storage device; and a controller for providing control signals to the power conditioning circuit to control the charging current provided to the energy storage device;

wherein the controller provides control signals to cause the power conditioning circuit to fully charge the energy storage device when the notification device is in a supervisory state in which the strobe circuit is inactive;

wherein the controller provides control signals to cause the power conditioning circuit to recharge the energy storage device when the strobe circuit is active and the energy storage device has been partially discharged;

wherein the controller provides control signals to the strobe circuit to reduce intensity of the light flashes during a period when the energy storage device is being recharged and the strobe circuit is active.

9. The notification device of claim 8, wherein the energy storage device comprises a supercapacitor.

10. The notification device of claim 8, wherein the supercapacitor has a voltage of about 300 volts to 400 volts when fully charged.

11. The notification device of claim 8, wherein the energy storage device has a capacity to store enough electrical energy for repeated generation of flashes at a rate of 1 Hz for at least 5 minutes without requiring recharging.

12. The notification device of claim 8, wherein in the supervisory state, voltage on the circuit wiring has a first polarity and in an active state, voltage on the circuit wiring has a second polarity opposite the first polarity, wherein the energy storage device is charged during the supervisory mode.

13. The notification device of claim 8, wherein the strobe circuit comprises a light source and a trigger circuit, and wherein the trigger circuit delivers electrical energy from the energy storage device to the light source to produce a light flash.

14. The notification device of claim 13, wherein the light source comprise a gas-filled flashtube.

* * * * *